Patented June 17, 1947

2,422,578

UNITED STATES PATENT OFFICE 2,422,578

REACTION PRODUCT OF ALKYLENEIMINE WITH AMMONIUM DITHIOCARBAMATE

Roger A. Mathes, Akron, Ohio, assignor to The B. F. Goodrich Company, New York, N. Y., a corporation of New York No Drawing. Application June 9, 1943, Serial No. 490,219

5 Claims. (Cl. 260—239)

This invention relates to the reaction products of alkyleneimines with ammonium dithiocarbamate.

These products, the structure of which is not definitely known, are useful as accelerators for the vulcanization of rubber, and also as activators for other accelerators, such as the mercaptobenzothiazoles or mercaptoalkylthiazoles. Only small amounts of my new product are necessary to achieve the desired results, either as activators or as accelerators. In general, from 0.1 to 5.0% or more, based on the rubber composition, may be used.

It has been found that alkyleneimines react, even at room temperature, with ammonium dithiocarbamate with the liberation of ammonia to form products of varying molecular weight, depending upon the amount of alkyleneimine employed. It appears that some sort of polymerization-type reaction occurs if more than one molecular proportion of the alkyleneimine is used for each molecular proportion of ammonium dithiocarbamate. It has been found that from one to seven or more molecular proportions of the alkyleneimine may be reacted with one molecular proportion of ammonium dithiocarbamate. All of these products have closely related chemical properties, all are accelerators for the vulcanization of rubber, and all are activators for mercaptothiazoles.

The alkyleneimines which may be used to make the products of my invention include not only ethyleneimine, propyleneimine, etc., but also the homologous hydrocarbon-substituted ethyleneimines, propyleneimines, and the like.

As specific examples of my invention, the following descriptions will serve more fully to illustrate my invention.

Example I

To a slurry of 22 g. of freshly prepared ammonium dithiocarbamate in 150 cc. of ethyl ether at room temperature was added slowly and with stirring 9.5 g. of ethyleneimine. The reaction mixture became warm, and a considerable amount of ammonia was liberated. The product, a light yellow viscous syrup, separated from the mixture. The ether layer was decanted, and the product was heated at 80° to 100° C. for about an hour to remove any remaining ether, ammonia, or unreacted ethyleneimine. About 26.2 g. of the product was obtained which gradually solidified to a white mushy solid after standing several hours at room temperature, the amount of product obtained indicating that one mole of ammonia was eliminated during the reaction. The product was water-soluble.

Example II

To a solution of 11 g. of ammonium dithiocarbamate in 50 cc. of water was added slowly and with stirring 4.8 g. of ethyleneimine. After the evolution of ammonia had ceased, the mixture of water and viscous oily product was heated at 100° to 110° C. to remove the water, ammonia, and unreacted ethyleneimine. About 13.2 g. of viscous syrup was obtained as the product.

Example III

To a slurry of 22 g. of ammonium dithiocarbamate in 150 cc. of ethyl ether was added 19 g. of ethyleneimine in the same manner as in Example I. After evaporation of the ether, there was obtained an almost colorless viscous syrup weighing about 34.5 g. The weight of product indicated that two moles of ethyleneimine had reacted with one mole of ammonium dithiocarbamate with the liberation of one mole of ammonia.

Example IV

To a slurry of 27.5 g. of ammonium dithiocarbamate in 100 cc. of ethyl alcohol at a temperature of 12° C. was added slowly and with stirring a solution of 43.5 g. of ethyleneimine in 150 cc. of ethyl alcohol. The temperature of the mixture rose to about 35° C. during the addition and considerable ammonia was evolved. After all of the ethyleneimine solution had been added the mixture was maintained at reflux temperature for about an hour and then the alcohol was removed by evaporation at room temperature. The product, a white gummy solid, weighed about 54 g., indicating that three moles of ethyleneimine had reacted with one of ammonium dithiocarbamate with the liberation of one mole of ammonia.

Example V

To a solution of 3.3 g. of ammonium dithiocarbamate in 25 cc. of water was added a solution of 10.32 g. of ethyleneimine in 25 cc. of water. The mixture was cooled to maintain the temperature at 25° to 35° C. during the addition. It was then heated at 100° to 120° C. until the weight became constant. About 9.0 g. of viscous liquid product was obtained, indicating that 5 moles of ethyleneimine had reacted with one mole of ammonium dithiocarbamate, with the liberation of one mole of ammonia.

Example VI

To a solution of 3.3 g. of ammonium dithiocarbamate in 25 cc. of water was added a solution of 20.64 g. of ethyleneimine in 20 cc. of water, in the same manner as in Example V. About 12.4 g. of viscous liquid product was obtained, indicating that about 8 moles of ethyleneimine had reacted with one mole of ammonium dithiocarbamate.

As an indication of the accelerating power of these compounds I shall describe the effect produced in rubber by the products of Example I and Example IV. The following rubber compositions, in which the parts are by weight, were prepared.

|  | A | B |
|---|---|---|
| Rubber | 100 | 100 |
| Zinc oxide | 5 | 5 |
| Lauric acid | 2 | 2 |
| Sulfur | 3 | 3 |
| Product of Example I | 1 | |
| Product of Example IV | | 1 |

After vulcanization in a press at 287° F. the compositions had the physical properties shown in the following table, in which T is the ultimate tensile strength in lb. per sq. in. and E is the ultimate elongation in percent.

| Time of vulcanization in min. | A | | B | |
|---|---|---|---|---|
| | T | E | T | E |
| 30 | 2,660 | 900 | 2,960 | 805 |
| 60 | 2,740 | 815 | 3,420 | 810 |
| 90 | 2,850 | 815 | 3,300 | 800 |
| 120 | 3,110 | 810 | 3,280 | 790 |

Equally good results may be obtained using other similar products.

These new products are quite stable and are capable of being stored for long periods of time at room temperature without deterioration.

Although I have described the preparation of these products carried out at room temperature and at atmospheric pressure, higher temperatures and pressures may also be employed if desired. Since ammonium dithiocarbamate decomposes at about 50° C. at atmospheric pressure, and since the use of higher pressures offers no advantages over the reaction carried out as described herein, it will generally be found desirable to employ a temperature of 50° C. or less for the reaction.

Although I have herein described specific embodiments of my invention, I do not intend to limit myself solely thereto, but only to the extent indicated in the appended claims.

I claim:

1. The chemical products obtained by reacting from 1 to 8 molecular proportions of an alkyleneimine having the structure

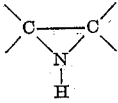

with one molecular proportion of ammonium dithiocarbamate at a temperature below about 50° C. in the presence of a liquid diluent inert to the reactants with the liberation of substantially one molecular proportion of ammonia, the said products being stable at room temperature and at temperatures as high as 80 to 120° C., and being active as accelerators for the vulcanization of rubber.

2. The products of claim 1 wherein the alkyleneimine is ethyleneimine.

3. The chemical product obtained by reacting one molecular proportion of ethyleneimine with one molecular proportion of ammonium dithiocarbamate at a temperature below about 50° C. in the presence of a liquid diluent inert to the reactants with the liberation of substantially one molecular proportion of ammonia, the said product being insoluble in water, being stable at room temperature and when heated at temperatures as high as 80 to 110° C., and being active as an accelerator for the vulcanization of rubber.

4. The chemical products obtained by reacting from two to eight molecular proportions of ethyleneimine with one molecular proportion of ammonium dithiocarbamate at a temperature below about 50° C. in the presence of a liquid diluent inert to the reactants with the liberation of substantially one molecular proportion of ammonia, the said products being stable at room temperature and at temperatures as high as 80 to 120° C., and being active as accelerators for the vulcanization of rubber.

5. The chemical product obtained by reacting five molecular proportions of ethyleneimine with one molecular proportion of ammonium dithiocarbamate at a temperature below about 50° C. in the presence of a liquid diluent inert to the reactants with the liberation of substantially one molecular proportion of ammonia, the said product being a viscous liquid stable at room temperature and when heated at temperatures as high as 100 to 120° C., and being active as an accelerator for the vulcanization of rubber.

ROGER A. MATHES.

REFERENCES CITED

The following references are of record in the file of this patent:

UNITED STATES PATENTS

| Number | Name | Date |
|---|---|---|
| 2,173,732 | Sebrell | Sept. 19, 1939 |
| 2,302,749 | Dean | Nov. 29, 1942 |
| 2,318,482 | Hanslick | May 4, 1943 |
| 2,303,593 | Williams | Dec. 1, 1942 |
| 2,258,847 | Cramer | Oct. 14, 1941 |
| 1,522,712 | Caldwell | Jan. 13, 1925 |
| 2,229,562 | Gracia | Jan. 21, 1941 |
| 2,187,719 | Williams | Jan. 23, 1940 |

FOREIGN PATENTS

| Number | Country | Date |
|---|---|---|
| 644,077 | Germany | Apr. 23, 1937 |

OTHER REFERENCES

Chem. Abstracts, vol. 24, (1930), page 3993.
Berichte der deutschen Chemischen Gesellschaft, vol. 32 (1899), page 2034.